Figure 6:
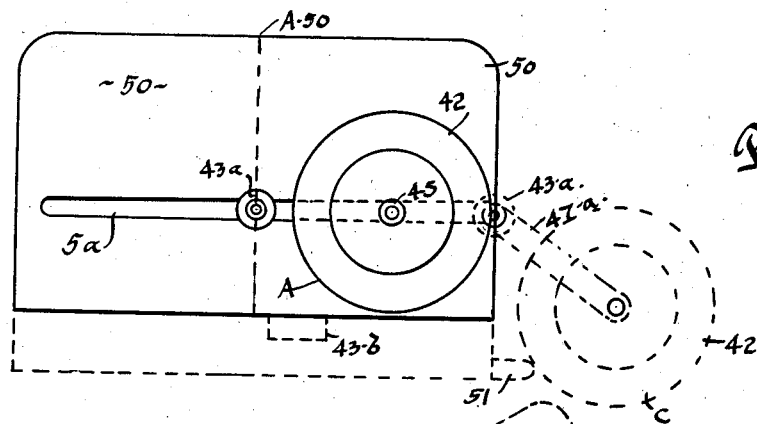

Aug. 6, 1940.　　　　J. D. LANGDON　　　　2,210,085
WHEEL AND TIRE CARRIER
Filed Sept. 15, 1937　　　　2 Sheets-Sheet 1
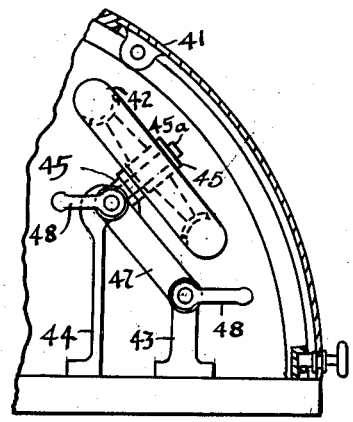
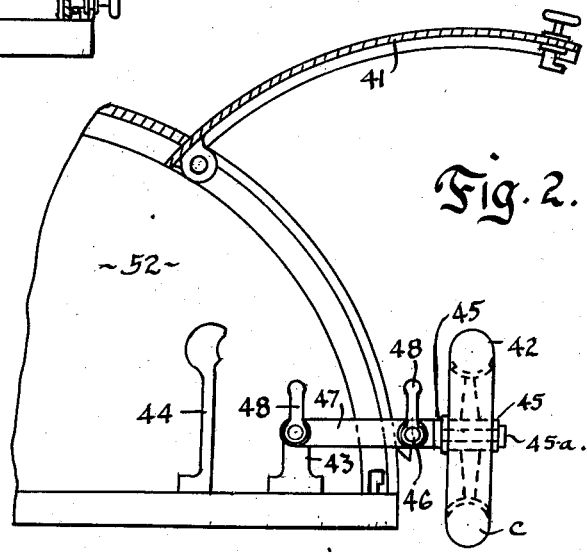
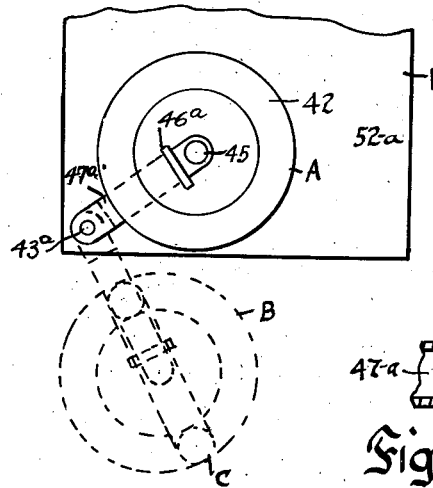
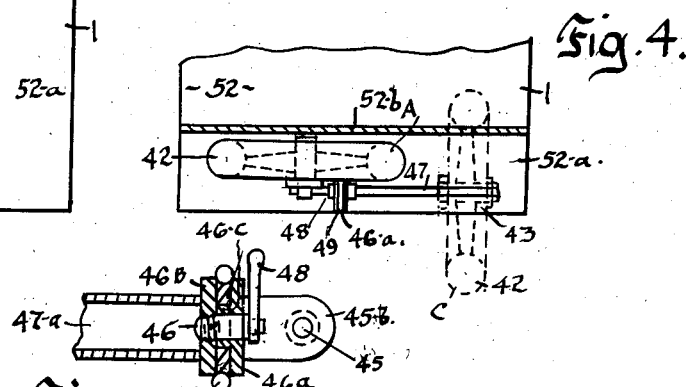
INVENTOR
J. D. Langdon Aug. 6, 1940.   J. D. LANGDON   2,210,085
WHEEL AND TIRE CARRIER
Filed Sept. 15, 1937   2 Sheets-Sheet 2

INVENTOR
J. D. Langdon

Patented Aug. 6, 1940

2,210,085

UNITED STATES PATENT OFFICE 2,210,085

WHEEL AND TIRE CARRIER

Jesse D. Langdon, Los Angeles, Calif.

Application September 15, 1937, Serial No. 163,978

5 Claims. (Cl. 224—29)

My invention relates to wheel and tire carriers particularly of the type for use with automotive vehicles, and the objects and purposes are:

First—The provision of a wheel and tire carrier adapted to be attached within a receptacle in the body of an automotive vehicle with a view to placing said tire in a convenient position for removal from and attachment to the carrier, said carrier being capable of projecting said tire to a point outside of the receptacle.

Second—To provide a spare tire carrier permitting the extension of a spare tire through an aperture from within the body of an automotive vehicle together with means to render said carrier operable with a minimum of effort.

Third—The provision of a tire bracket to hold a spare wheel or tire within a compartment in a position for removal from said bracket while within said compartment, said bracket or spare tire capable of being extended from said compartment while attached to the carrier.

Fourth—The provision of means whereby a spare tire or wheel can be rolled to and fro to eliminate the necessity of lifting the weight of a spare tire, wheel or rim for attaching to a tire carrier.

Fifth—To provide means in combination with a spare tire carrier whereby a tire can be extended from within a compartment in the vehicle and the position of the tire changed from a horizontal to a vertical attitude or held in a convenient reclining position to meet the contingencies of use.

Sixth—To permit swinging a spare wheel or tire from within a compartment while attached to a carrier for a convenient placing of other objects or articles in said compartment.

Seventh—To provide a spare wheel and tire carrier of simple construction having maximum mobility to permit the disposal of a spare wheel or tire in various positions within or outside of a compartment in a motive vehicle body.

This invention includes the showing illustrated by the drawings Figs. 13, 14 and 15, inclusive as described by the specification, page 2, lines 61 to 63, inclusive, but not claimed, in U. S. Patent No. 2,091,076, issued to the present applicant on August 24, 1937, and other and further improvements to achieve the same and other purposes than those set forth in the original application, Serial No. 9,457, March 5, 1935, now Patent No. 2,091,076, dated Aug. 24, 1937.

Other and further objects and purposes of the invention will appear during the disclosure of the specification, as illustrated by the drawings which are for the purpose of aiding those skilled in the art to design and build the same. It is understood that the form of the invention illustrated may be changed within the scope of the claims.

Identical numerals with added characters indicate similar parts in the original application for U. S. Patent No. 2,091,076 and in the present application, with additional numerals to indicate new forms of structure herein shown.

The drawings are diagrammatic.

Fig. 1, formerly 13 of U. S. Patent No. 2,091,076, consists of a fragmentary, longitudinal section of a rear body portion and door of an automotive vehicle with the wheel and tire carrier disposed within a compartment thereof.

Fig. 2, formerly Fig. 14 of U. S. Patent No. 2,091,076, is a fragmentary section, longitudinal of an automotive vehicle body, showing the carrier extended outside of the compartment.

Fig. 3 is a plan viewed from the top showing the spare wheel or tire 42 disposed in position A and attached to arm 47a shown in solid lines within the body 1, position B outside the body being shown in dotted lines, the carrier arm 47 being swung on pivotal attachment 43a.

Fig. 4 is a diagram showing a section of compartment 52 with spare wheel and tire 42 in position A in solid lines. The vertical position C is shown in dotted lines outside of body 1. The carrier rides on caster or roller 49 supported by the floor of compartment 52, viewed from rear.

Fig. 5 is a fragmentary, longitudinal section of carrier arm 47a and part of pivot flanges 46a and 46b and caster or roller 49 including the hub mounting 45b, pivot lock handle 48 constituting the pivotal spare tire mounting assembly.

Fig. 6 is a diagram of a rear elevation of an automobile seat having a groove 5a into which is journaled a pivotal attachment 43a, position A being vertical for the spare wheel and tire 42 when inside of an automotive body. Position C is shown in dotted lines outside of the body with the tire resting on running board 51.

Figure 7:
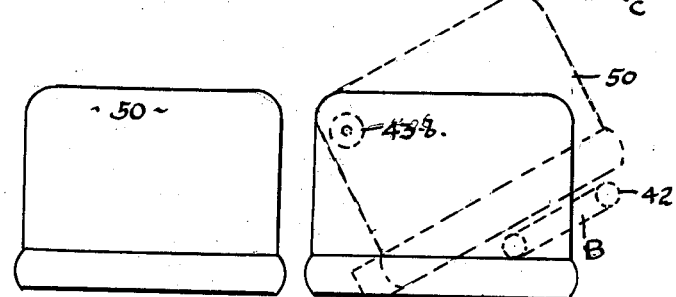

Fig. 7 is a top plan diagram of two seats separated as at line A50, Fig. 6. Position B shows the intermediate position of the carrier and spare wheel swung at an angle upon pivot 43b.

Figure 8:
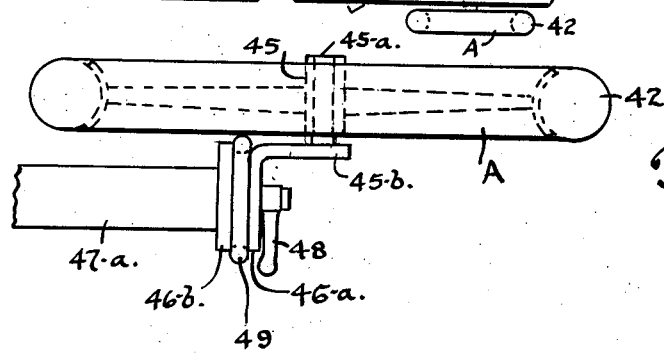

Fig. 8 is an edge elevation of a fragmentary portion of the carrier arm 47a mounting the wheel and tire 42, showing caster or roller 49, flange 46a and flange 46b together with handle 48 and axis bolt 46 forming longitudinally disposed pivot in relation to the arm 47a.

The structure comprising my invention and the operation thereof is as follows:

A pivotal attachment of any conventional form 43, 43a, 43b, is disposed within a compartment 52 or 52a of an automotive vehicle. Said pivotal attachment serves to carry an arm 47 or 47a having mounted thereon a tire bracket 45 or 45b which in turn is pivotally attached to the end of the arm 47 or 47a, the handle 48 being threaded onto bolt or axis 46 permitting the bracket to be locked integral with the carrier arm 47 or 47a or serving to release the tire bracket 45 or 45b for pivotal movement at the end of carrier arm 47 or 47a to various positions of disposal.

Fig. 1 shows the wheel and tire carrier pivotally disposed in a reclining position to permit the removal of a spare wheel or tire 42 while the carrier is resting upon support 44, in which position the carrier may be bound by the use of handles 48. A nut 45 is provided to hold the hub of the wheel and tire in place on bracket 45.

Fig. 2 shows a spare wheel and tire projected outside of and through an opening in the body 1 with the wheel and tire 42 held in vertical position. The pivot 46 permits the wheel and tire to be held in a horizontal or vertical position as desired.

It will be noted that Figs. 1 and 2 show the pivot 46 to be horizontally disposed transverse to the arm 47, while the Figs. 3, 4, 5 and 8 show the pivot 46 to be in longitudinal alignment with the arm 47a. Both forms of pivot disposal permit the spare wheel and tire to be changed from a horizontal to a vertical position C or to various other angles and positions in relation to the carrier arm 47 and 47a and the vehicle to which the carrier is attached.

Fig. 3 shows the carrier arm 47a pivotally attached in one corner of a compartment to be swung on a horizontal plane in and out of said compartment, the hub flange and bracket 45 being attached by a pivot connection 46a, pivot connection 46b having an axis bolt 46 disposed longitudinally parallel to the arm 47a in a manner whereby the wheel and tire 42 may be rotated on said axis 46 while the axis of the wheel and tire 42 is disposed transversely of the pivotal axis 46.

Fig. 4 shows the spare wheel and tire carrier disposed within a compartment 52a formed by the floor 52b of compartment 52 between the floor of body 1 and floor 52b. The carrier arm 47a is swung from pivot 43a located at the right hand side of compartment 52a and may be moved on a horizontal plane to be extended outside of body 1, a caster or roller 49 being provided to ride on the floor of body 1 to facilitate the easy movement of the bracket and carrier within the compartment 52a. A bushing is formed by an extension 46c through the center of roller 49 if it is desired to lock the spare wheel and tire in a given position without affecting the rotation of caster or roller 49. If caster 49 is axelled upon the axis bolt 46 the handle 48 may be used to lock caster 49 and members 46a and 46b integral to hold the spare wheel and tire carrier within the compartment 52a by the frictional resistance of the caster or roller 49 which is preferably tired with rubber.

Fig. 5 is a section of the pivotal assembly showing how the members 46a, 46b and 49 may be clamped together in a fixed position.

Fig. 6 shows the back of an automotive vehicle seat 50 having a groove 5a into which the axis 43b is journaled to permit movement across the back of the seat to allow the wheel and tire 42 to be rolled from behind the seat and out of the side door of the vehicle while attached to the carrier arm 47a. The seat may be divided at dotted line A50 and the wheel and tire may be swung to various positions by the use of pivot 43b.

Fig. 7 is an alternative structure utilizing one of the seats 50 of an automotive vehicle as a carrier attaching base. The right hand seat is pivotally attached to the floor as at 43b permitting the seat to be swung to change the wheel and tire from position A to position B. The tire may then be moved to position C as of Fig. 6.

Fig. 8 is a fragmentary portion of carrier arm 47a showing members 46a, 46b, 49 and 48, including the wheel and tire 42 in elevation as the assembly will be disposed in horizontal position.

Having described the construction of my invention and the operation and use thereof, I claim:

1. A wheel and tire carrier pivotally attached to an automotive vehicle, comprising a tire supporting member having its proximal end attached to said vehicle and pivoted to be swung on a horizontal plane, a second tire supporting member pivotally attached to the distal end of the first named member and holding said tire in a position lying parallel with the first-named tire supporting member and adapted to rotate about an axis disposed on a horizontal plane, in alignment with the first named tire supporting member whereby a tire attached to the second named member may be changed from a horizontal to a vertical position.

2. A wheel and tire carrier comprising vertical and horizontal pivot elements incorporated with a horizontally disposed swinging arm attached at its inner end by one of said pivot elements within the body of a vehicle and having a tire carrier member mounted on the outer end thereof holding a tire in position lying parallel to and along said arm, said tire carrier member rotatably mounted on the second of said pivot elements which is formed by an extension of said horizontally disposed swinging arm.

3. A tire carrier comprising a horizontally extended arm swung about a pivot attached to an automotive vehicle, a pivot extension to said arm and mounting a tire pivoted on said pivot extension, the axis of the tire standing substantially at right angles to said arm and pivot extension whereby said tire is rotated about said arm while lying parallel therewith.

4. A wheel and tire carrier comprising vertical and horizontal pivot elements incorporated with a swinging arm attached by one of said pivot elements within the body of a vehicle and having a tire carrier member pivotally mounted thereon to carry a tire in a plane substantially parallel to the arm of said tire carrier member and capable of being rotated about an axis in line with said arm and constituting the second of said pivot elements while the axis of said tire stands substantially at right angles thereto.

5. A wheel and tire carrier as of claim 28 having a castor rotatably mounted on said arm near the outer end and adapted to ride on the floor of a vehicle to carry the weight of the tire mounted on the swinging arm.

JESSE D. LANGDON.

CERTIFICATE OF CORRECTION.

Patent No. 2,210,085.  August 6, 1940.

JESSE D. LANGDON.

It is hereby certified that error appears in the printed specification of the above numbered patent requiring correction as follows: Page 2, second column, line 68, claim 5, for the claim reference numeral "28" read --4--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.